United States Patent
Ozawa et al.

(10) Patent No.: US 12,217,344 B2
(45) Date of Patent: Feb. 4, 2025

(54) WEARING SIMULATION DEVICE

(71) Applicant: ASICS CORPORATION, Kobe (JP)

(72) Inventors: Akihiro Ozawa, Hyogo (JP); Nanako Sumi, Hyogo (JP)

(73) Assignee: ASICS CORPORATION, Kobe (JP)

( * ) Notice: Subject to any disclaimer, the term of this patent is extended or adjusted under 35 U.S.C. 154(b) by 28 days.

(21) Appl. No.: 17/664,548

(22) Filed: May 23, 2022

(65) Prior Publication Data

US 2022/0383575 A1 Dec. 1, 2022

(30) Foreign Application Priority Data

May 27, 2021 (JP) .................................. 2021-089412

(51) Int. Cl.
*G06T 13/40* (2011.01)
(52) U.S. Cl.
CPC .......... *G06T 13/40* (2013.01); *G06T 2210/16* (2013.01)
(58) Field of Classification Search
None
See application file for complete search history.

(56) References Cited

U.S. PATENT DOCUMENTS

| 6,535,215 B1* | 3/2003 | DeWitt | G06T 13/40 |
| | | | 345/473 |
| 2008/0031512 A1* | 2/2008 | Mundermann | G06V 40/23 |
| | | | 382/154 |
| 2011/0298897 A1* | 12/2011 | Sareen | G06Q 30/06 |
| | | | 348/47 |
| 2012/0038628 A1* | 2/2012 | Corazza | G06T 13/40 |
| | | | 345/419 |
| 2015/0134495 A1* | 5/2015 | Naware | G06F 30/20 |
| | | | 705/27.2 |

(Continued)

FOREIGN PATENT DOCUMENTS

| JP | H08-044785 A | 2/1996 |
| JP | 2004-13486 A | 1/2004 |

(Continued)

OTHER PUBLICATIONS

"Changing Clothes / Appearance | Second Life | 2017 |", IFoxiel, Youtube https://www.youtube.com/watch?v=IKU-A9jXezA; (Year: 2017).*

(Continued)

*Primary Examiner* — Steven Z Elbinger
(74) *Attorney, Agent, or Firm* — Studebaker & Brackett PC

(57) ABSTRACT

A wearing simulation device includes a first animation generation unit that generates a first animation indicating a change in a movement of a body and a surface shape of the body from a second posture to a first posture, a second animation generation unit that generates a second animation indicating a change in a movement of the body and a surface shape of the body in a continuous movement, a third animation generation unit that generates a third animation by connecting the first animation and the second animation, and a simulation execution unit that makes the body wear a clothing model in at least one frame from beginning of the third animation, deforms the clothing model so as to follow the change in the movement of the body and the surface shape of the body in the frame after wearing, and simulates a shape change of the clothing model.

11 Claims, 9 Drawing Sheets

(56) References Cited

U.S. PATENT DOCUMENTS

| | | | |
|---|---|---|---|
| 2017/0046769 A1* | 2/2017 | Jackson | G06Q 30/0643 |
| 2020/0121556 A1* | 4/2020 | Tian | A61H 39/02 |
| 2020/0302687 A1* | 9/2020 | Barbic | G06T 17/20 |
| 2021/0358222 A1* | 11/2021 | Pejsa | G06F 3/0346 |

FOREIGN PATENT DOCUMENTS

| | | |
|---|---|---|
| JP | 2008-140364 A | 6/2008 |
| JP | 2013-200770 A | 10/2013 |

OTHER PUBLICATIONS

"SL—Fashion Model Walk Male—avatar animation for Second Life", MocapDancerSL, Youtube Dec. 31, 2020 https://www.youtube.com/watch?v=LI8BeIY26ds (Year: 2020).*

Mao et al. (CN-101140663-A) published Mar. 12, 2008 (Year: 2008).*

Zhang et al., Wearing Tightness Simulating Method And System Thereof, Aug. 28, 2018, CN 104751514 B (Year: 2018).*

Akihiro Ozawa et al. "Tensile Deformation Analysis of Sportswear Using Cloth Simulation" Journal of Textile Engineering, Aug. 15, 2020, pp. 55-61, vol. 66 No. 4.

An Office Action mailed by the Japanese Patent Office on Dec. 12, 2023, which corresponds to Japanese Application No. 2021-089412 with English translation.

* cited by examiner

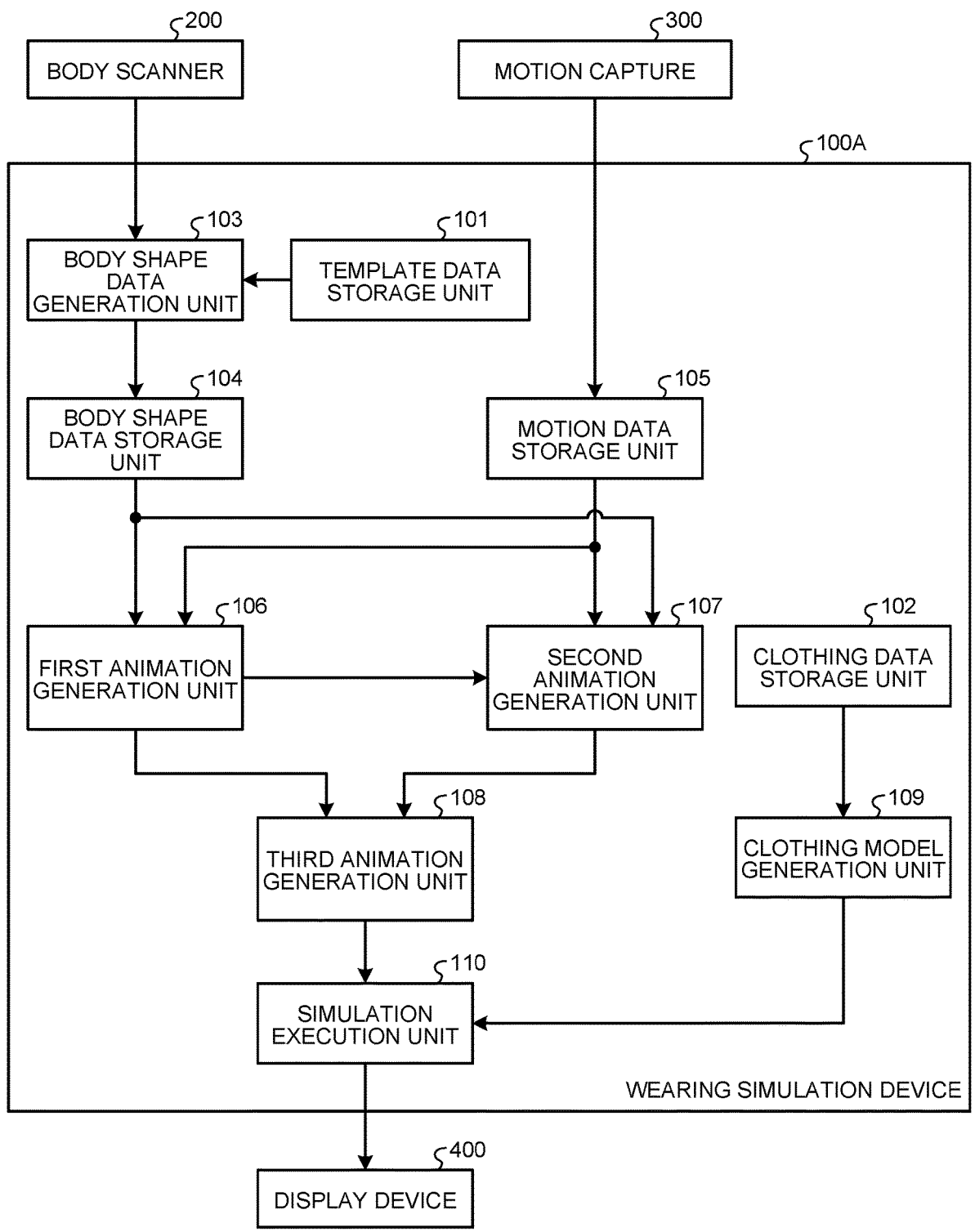

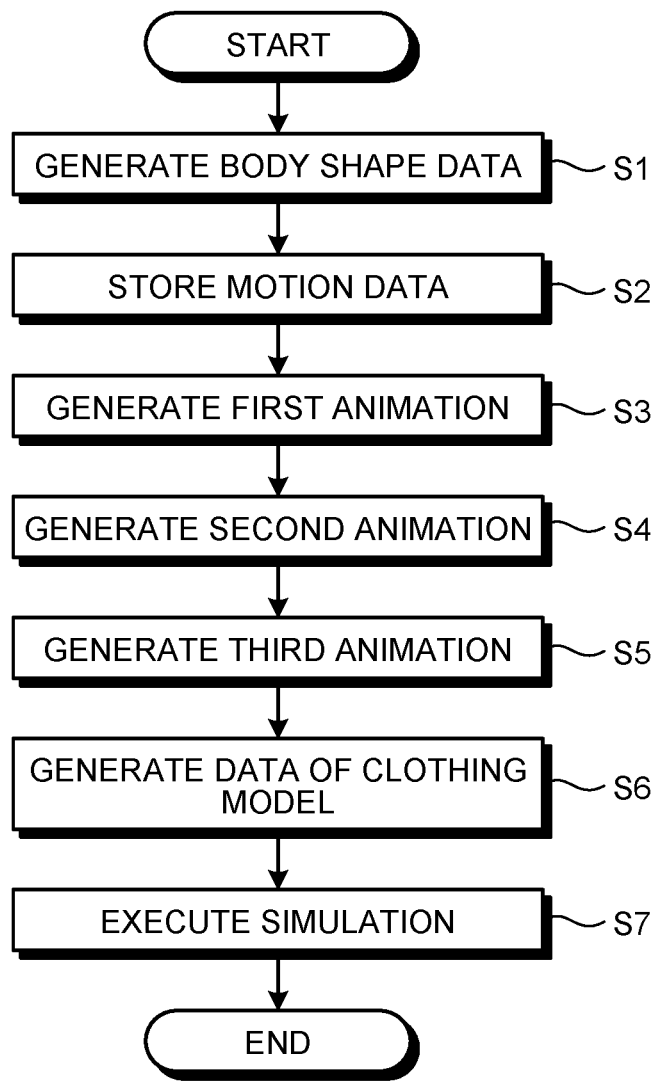

WEARING SIMULATION DEVICE

CROSS-REFERENCE TO RELATED APPLICATIONS

The present application claims priority to and incorporates by reference the entire contents of Japanese Patent Application No. 2021-089412 filed in Japan on May 27, 2021.

BACKGROUND OF THE INVENTION

1. Field of the Invention

The present invention relates to a wearing simulation device that simulates a wearing condition of clothing at the time of exercise.

2. Description of the Related Art

For clothing that is worn at the time of exercise, in order to reduce an air resistance at the time of running or reducing a grabbing width at the time of contact play, a silhouette that fits a wearer's body is often adopted. Clothing that fits the wearer's body is required to deform so as to follow a movement of the body of the wearer and not to prevent the movement of the wearer's body. A method for changing a design after a sample of the clothing is created and a wearing condition is confirmed takes time and cost. Therefore, a method is used for simulating the wearing condition of the clothing at the time of exercise and changing the design of the clothing on the basis of the simulation result.

JP 8-44785 A discloses the invention for converting clothing characteristics of clothing and a movement of the clothing into computer graphics through calculation. The invention disclosed in JP 8-44785 A divides a pattern paper of the clothing including numerical value data into fine grid-like small pieces, executes processing for detecting a collision between a fabric and a human body at the time when mechanical properties of the fabric and a movement of the fabric are calculated and the clothing is worn on a human body shape including the numerical value data, and predictively displays a wearing condition of the clothing.

In the human body, when joints are extended or flexed, a degree of a bump of a body portion surface changes and wrinkles are generated in the skin according to contraction and relaxation of muscles. Therefore, in order to simulate the wearing condition of the clothing at the time of exercise, it is necessary to simulate the wearing condition of the clothing while reflecting a change in a surface shape of the body at the time of exercise.

In order to reflect the change in the surface shape of the body at the time of exercise, it is necessary to capture a continuous movement of the body by a motion capture and deform the clothing so as to follow the body according to the captured movement. However, because a capturing range of the motion capture is restricted by an angle of view, there is a case where the motion capture needs to start to capture the movement from the middle of the exercise. If the capturing of the movement is started from the middle of the exercise, an initial posture of the captured movement is not a posture in which a clothing model can be worn on a body model.

Therefore, with the invention disclosed in JP 8-44785 A, it has not been possible to accurately predict the wearing condition of the clothing while reflecting the change in the surface shape of the body at the time of exercise.

The present invention has been made in view of the above, and an object of the present invention is to obtain a wearing simulation device that can simulate a wearing condition of clothing while reflecting a change in a surface shape of a body at the time of exercise.

SUMMARY OF THE INVENTION

A wearing simulation device includes: a body shape data storage unit configured to store three-dimensional shape data of a body; a motion data storage unit configured to store motion data that indicates a movement of the body in a continuous movement starting from a first posture; a first animation generation unit configured to generate a first animation, on the basis of the three-dimensional shape data of the body and the motion data, that includes a plurality of frames and indicates a change in a movement of the body and a surface shape of the body from a second posture different from the first posture to the first posture; a second animation generation unit configured to generate a second animation, on the basis of the three-dimensional shape data of the body and the motion data, that includes a plurality of frames and indicates a change in the movement of the body and the surface shape of the body in the continuous movement; a third animation generation unit configured to generate a third animation including a plurality of frames by connecting the first animation and the second animation; a clothing model generation unit configured to generate data of a clothing model having a three-dimensional shape on the basis of part data that indicates shapes of parts configuring clothing and property data of a material of the part; and a simulation execution unit configured to make a body with the second posture wear the clothing model in at least one frame from beginning in the third animation and deform the clothing model so as to follow the change in the movement of the body and the surface shape of the body in the continuous movement in a frame after a frame in which the body with the second posture has worn the clothing model so as to simulate the continuous movement of the body that wears the clothing model and a shape change of the clothing model in the continuous movement.

BRIEF DESCRIPTION OF THE DRAWINGS

FIG. 1 is a diagram illustrating a configuration of a wearing simulation device according to a first embodiment of the present invention;

FIG. 3 is a flowchart illustrating a flow of an operation of the wearing simulation device according to the first embodiment;

DETAILED DESCRIPTION OF THE PREFERRED EMBODIMENTS

Figure 2A:
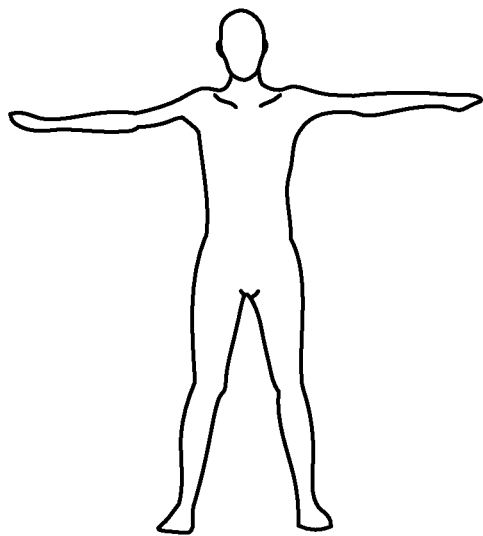
FIGS. 2A and 2B are diagrams illustrating a second posture of the wearing simulation device according to the first embodiment.

Hereinafter, embodiments of a wearing simulation device according to the present invention will be described in detail with reference to the drawings. Note that the embodiments do not limit the present invention. Note that, in the following embodiments, the same or common components are denoted with the same reference numeral, and description thereof is not repeated.

First Embodiment

FIG. 1 is a diagram illustrating a configuration of a wearing simulation device according to a first embodiment of the present invention. A wearing simulation device 100A according to the first embodiment includes a template data storage unit 101 that stores template data indicating standard structures of a skeleton and muscles. The template data storage unit 101 stores a plurality of pieces of template data for each gender segmentalized on the basis of the race and age, for example. In addition, a plurality of pieces of template data for each body shape segmentalized on the basis of the height, weight, body mass index (BMI), or the like or a plurality of pieces of template data including a combination of the gender and the body shape may be stored.

Furthermore, the wearing simulation device 100A includes a clothing data storage unit 102 that stores part data indicating shapes of a plurality of parts configuring clothing, property data of a material of each of the plurality of parts, and sewing information indicating how to connect the parts.

Furthermore, the wearing simulation device 100A includes a body shape data generation unit 103 that generates three-dimensional shape data of a body by synthesizing three-dimensional surface shape data generated by scanning a human body with a body scanner 200 with the template data, a body shape data storage unit 104 that stores the three-dimensional shape data of the body generated by the body shape data generation unit 103, and a motion data storage unit 105 that stores motion data indicating a movement of the body in a continuous movement starting from a first posture. The motion data stored in the motion data storage unit 105 is generated by capturing an actual movement of the human body using a motion capture 300.

Furthermore, the wearing simulation device 100A includes a first animation generation unit 106 that generates a first animation that includes a plurality of frames and indicates a change in a movement of the body and a surface shape of the body from a second posture different from the first posture to the first posture on the basis of the three-dimensional shape data and the motion data of the body, a second animation generation unit 107 that generates a second animation that includes a plurality of frames and indicates a change in the movement of the body and the surface shape of the body in the continuous movement on the basis of the three-dimensional shape data and the motion data of the body, and a third animation generation unit 108 that generates a third animation, in which the first animation and the second animation are connected, including a plurality of frames.

Figure 2B:
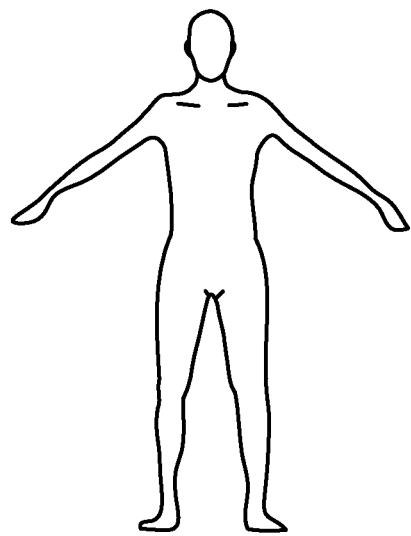

In the first embodiment, the second posture is a stationary standing posture in which both legs are opened to about a shoulder width and knee joints and elbow joints are extended. FIGS. 2A and 2B are diagrams illustrating the second posture of the wearing simulation device according to the first embodiment. In a case where the continuous movement starting from the first posture includes a posture in which an arm is raised to be higher than a shoulder, as illustrated in FIG. 2A, a T pose in which both arms are horizontally extended is generally used as the second posture. Furthermore, in a case where the continuous movement starting from the first posture does not include the posture in which the arm is raised to be higher than the shoulder, as illustrated in FIG. 2B, an A pose in which the both arms are obliquely extended to the lower side is used as the second posture in general. Note that the second posture may be a posture different from the exemplified A pose or T pose.

Furthermore, the wearing simulation device 100A includes a clothing model generation unit 109 that generates data of a clothing model having a three-dimensional shape on the basis of the part data, the property data, and the sewing information. The clothing model generation unit 109 generates the data of the clothing model having the three-dimensional shape by connecting the plurality of parts on the basis of the sewing information.

Furthermore, the wearing simulation device 100A includes a simulation execution unit 110 that makes a body with the second posture wear the clothing model in at least one frame from the beginning of the third animation and deforms the clothing model so as to follow the change in the movement of the body and the surface shape of the body in the continuous movement in a frame after a frame in which the clothing model has been worn on the body with the second posture so as to simulate a continuous movement of the body wearing the clothing model and a shape change of the clothing model in the continuous movement. The simulation execution unit 110 makes a display device 400 display a simulation result. The display device 400 displays a wearing condition of the clothing in each frame of the third animation in which the continuous movement is performed from the second posture via the first posture as an animation.

The simulation execution unit 110 changes a state of the clothing model so as to follow the change in the movement of the body and the body surface so as to simulate a tensile force generated on a fabric of the clothing during exercise, an elongation rate of the fabric, and a wearing pressure received from the clothing by the body. For example, the simulation execution unit 110 makes the display device 400 display a simulation result so as to display a portion with a higher tensile force, elongation rate, and wearing pressure with a darker color. In addition, the simulation execution unit 110 may simulate a gap between the body and the fabric of the clothing, a curvature of the fabric, or the like and reflect these in the simulation result.

FIG. 3 is a flowchart illustrating a flow of an operation of the wearing simulation device according to the first embodiment. In step S1, the body shape data generation unit 103 generates body shape data on the basis of the three-dimensional surface shape data input from the body scanner 200 and the template data read from the template data storage unit 101 and makes the body shape data storage unit 104 store the body shape data. In step S2, the motion data storage unit 105 stores the motion data captured using the motion capture 300.

In step S3, the first animation generation unit 106 generates the first animation that indicates the change in the movement of the body and the surface shape of the body from the second posture to the first posture that is an initial posture in the continuous movement. Note that, here, the change in the surface shape of the body includes expansion and contraction of the skin and a change in a bump state of a body portion surface caused by contraction and relaxation of muscles.

The first animation generation unit 106 generates the first animation by interpolating a posture and a surface shape of the body between the second posture and the first posture by arithmetic processing. For example, the first animation generation unit 106 interpolates so as to move joints from the second posture to the first posture at a certain speed or interpolates so as to slow the movements of the joints as the posture approaches the first posture. Furthermore, the first animation generation unit 106 may generate the first animation on the basis of a joint angle for each frame that is manually input via an input interface (not illustrated). Furthermore, the first animation generation unit 106 may correct the joint angle interpolated by the arithmetic processing on the basis of the joint angle for each frame that is manually input via the input interface (not illustrated).

In step S4, the second animation generation unit 107 generates the second animation indicating the change in the movement of the body and the surface shape of the body during the continuous movement. In step S5, the third animation generation unit 108 generates the third animation in which the first animation and the second animation are connected. The third animation indicates a change in the movement of the body and the body surface when the continuous movement is performed after the body is moved from the second posture to the first posture.

In step S6, the clothing model generation unit 109 generates the data of the clothing model having the three-dimensional shape on the basis of the part data, the property data, and the sewing information read from the clothing data storage unit 102. In step S7, the simulation execution unit 110 simulates the wearing condition of the clothing when the continuous movement is performed after the body is moved from the second posture to the first posture. The simulation execution unit 110 makes the body with the second posture wear the clothing model in at least one frame from the beginning of the third animation and deforms the clothing model so as to follow the change in the movement of the body and the surface shape of the body in the continuous movement in a frame after the frame in which the clothing model has been worn on the body with the second posture so as to simulate a shape change of the clothing model following the change in the movement of the body and the body surface when the continuous movement is performed after the body is moved from the second posture to the first posture. Note that the flowchart illustrated in FIG. 3 is an example, and order of some steps may be changed. For example, step S6 for generating the data of the clothing model having the three-dimensional shape may be performed at any stage prior to step S5.

Because a capturing range is restricted by an angle of view, there is a case where it is not possible for the motion capture 300 that captures the continuous movement of the body to capture a desired operation when an exercise is started from the stationary standing posture and the operation is captured. For example, in a case where a running form is captured by the motion capture 300 and the running form after the form is stabilized is a desired operation, if a person starts running after taking the stationary standing posture within the capturing range, the person runs out of the capturing range before the form is stabilized, and it is not possible to capture a stable running form. In order to keep the stable running form within the capturing range of the motion capture 300, it is necessary to start capturing from the middle of the exercise. On the other hand, because it is not possible to wear clothing at a posture in which the joints are at flexed positions in a case where a body of a three-dimensional model wears the clothing, it is necessary to wear the clothing on the body with the stationary standing posture. In the running form captured from the middle of the exercise, an initial posture is not the stationary standing posture. Therefore, it is not possible to wear the clothing on the body of the three-dimensional model. In this way, even if the continuous exercise is captured by the motion capture 300, there is a case where it is not possible to wear the clothing on the body of the three-dimensional model.

Figure 4:
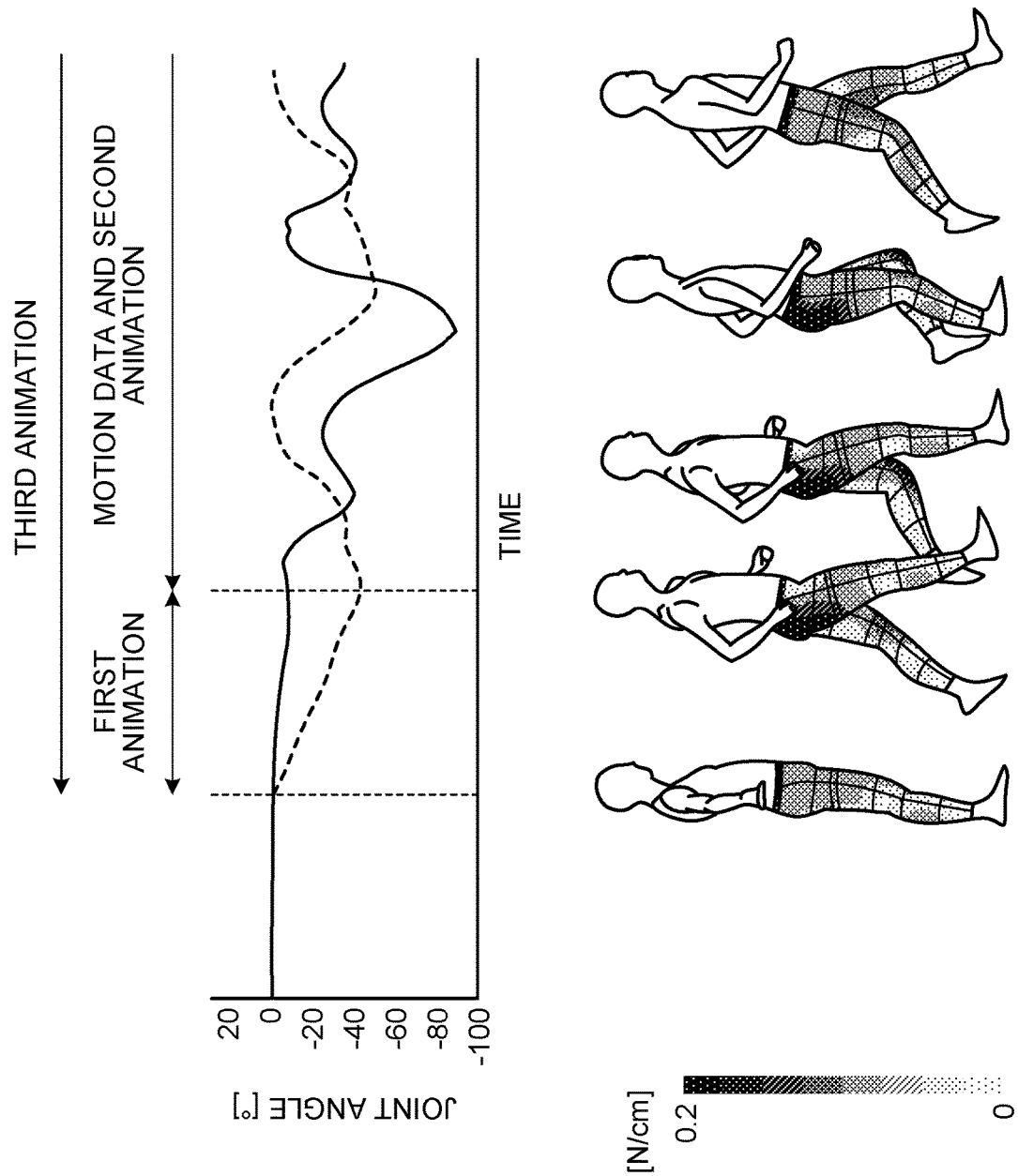
FIG. 4 is a diagram illustrating a relationship between motion data, a first animation, a second animation, and a third animation of the wearing simulation device according to the first embodiment.

FIG. 4 is a diagram illustrating a relationship between the motion data, the first animation, the second animation, and the third animation of the wearing simulation device according to the first embodiment. A solid line in FIG. 4 indicates a flexion and extension angle of a knee joint, and a broken line indicates a flexion and extension angle of a hip joint. Note that, here, because clothing covering the lower body is assumed as a simulation target, the joint angles of the knee joints and the hip joint are illustrated. However, in a case where closing covering the upper body is assumed as a simulation target, a posture is defined by angles of elbow joints, shoulder angles, or the like. Since the operation is captured while passing through the capturing range of the motion capture 300, the motion data starts from a posture with flexing joints. Therefore, it is difficult for the simulation execution unit 110 to cause the body of the three-dimensional model with the initial posture in the second animation indicating the change in the movement of the body and the surface shape of the body indicated by the motion data, to wear the clothing model. Therefore, the wearing simulation device 100A according to the first embodiment generates the first animation that indicates the change in the movement of the body and the surface shape of the body from the second posture that is the stationary standing posture to the first posture that is the initial posture in the motion data and generates the third animation by connecting the first animation to the second animation that indicates the change in the movement of the body and the surface shape of the body in the operation indicated by the motion data. Because at least one frame at the beginning of the third animation includes the stationary standing posture, it is easy for the body of the three-dimensional model to wear the clothing. Moreover, because the part of the third animation based on the second animation indicates the change in the movement of the body and the body surface when the continuous movement is performed, it is possible to reflect the change in the surface shape of the body at the time of exercise and to simulate the wearing condition of the clothing at the time of exercise.

In this way, because the wearing simulation device 100A according to the first embodiment generates the third animation obtained by connecting the first animation that is generated on the basis of the three-dimensional shape data of the body based on the three-dimensional surface shape data generated by scanning the human body by the body scanner 200 and the template data and the second animation that is generated on the basis of motion data that is actually captured by the motion capture 300, even if an operation, captured by the motion capture 300, desired to be simulated does not start from the stationary standing posture, the wearing simulation device 100A can simulate the wearing condition of the clothing using the third animation.

Second Embodiment

Figure 5:
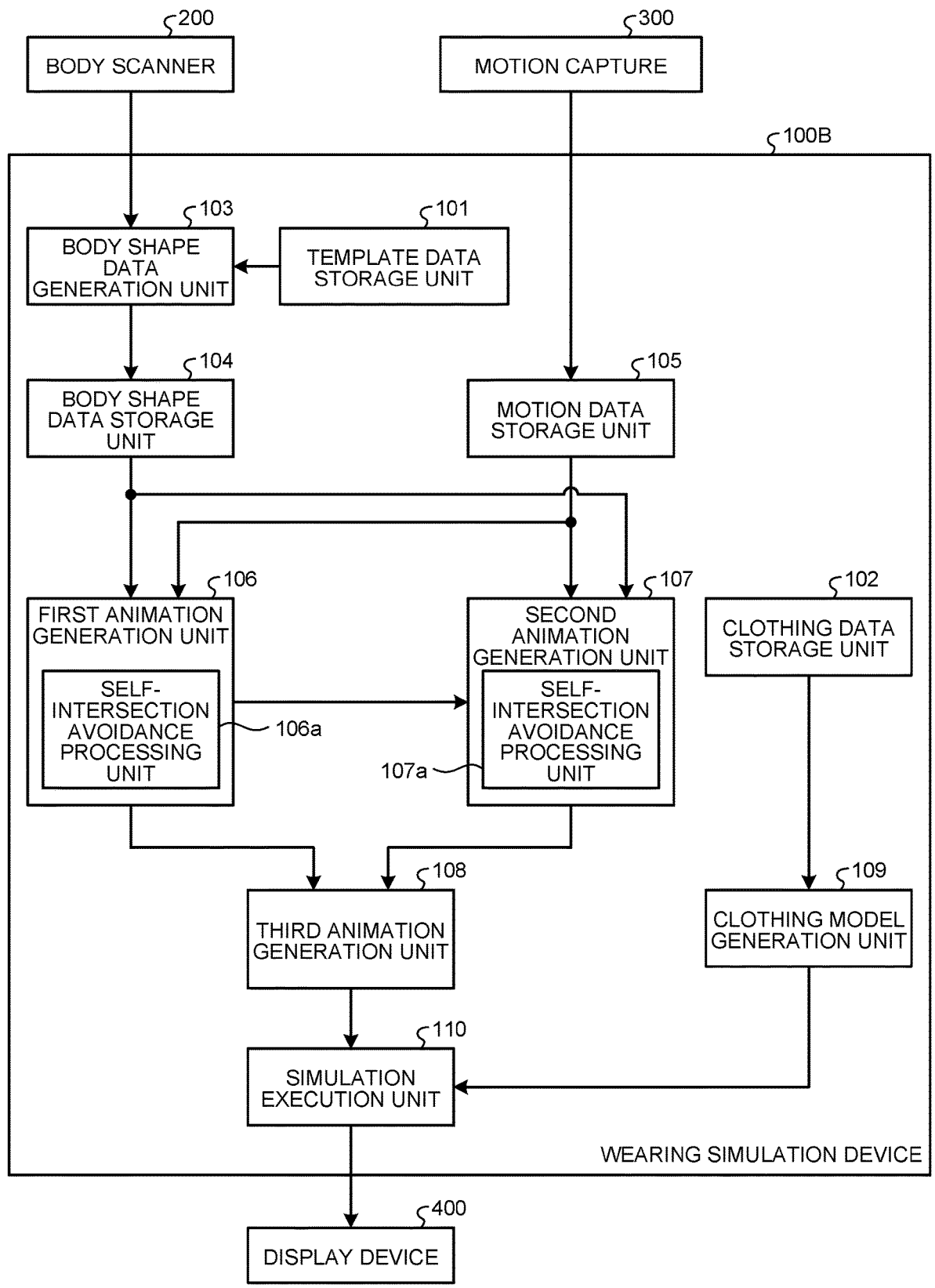
FIG. 5 is a diagram illustrating a configuration of a wearing simulation device according to a second embodiment of the present invention.

FIG. 5 is a diagram illustrating a configuration of a wearing simulation device according to a second embodiment of the present invention. A wearing simulation device 100B according to the second embodiment is different from the wearing simulation device 100A according to the first embodiment in that the first animation generation unit 106 and the second animation generation unit 107 respectively include self-intersection avoidance processing units 106*a* and 107*a*. In a case where a first animation includes a frame in which a self-intersection in which parts configuring a body interfere with each other occurs, the self-intersection avoidance processing unit 106*a* executes processing for changing at least one of a joint angle and a surface shape of the body and avoiding the self-intersection. In a case where a second animation includes a frame in which a self-intersection in which parts configuring the body interfere with each other occurs, the self-intersection avoidance processing unit 107*a* executes processing for changing at least one of the joint angle and the surface shape of the body and avoiding the self-intersection. Others are similar to those in the wearing simulation device 100A according to the first embodiment.

In a case where a continuous movement of the body is captured by a motion capture 300, there is a case where it is recognized that interference occurs although the parts configuring the body do not actually interfere with each other. For example, in a case where an operation for largely flexing a forearm is performed, there is a case where the operation is recognized as a posture in a state where the forearm dents an upper arm. Such a phenomenon is called "self-intersection". When the self-intersection occurs, it is not possible for clothing to follow the change in the surface shape of the body. Therefore, if the first animation or the second animation includes the frame in which the self-intersection occurs, the frame in which the self-intersection occurs is also included in a third animation, it is not possible to deform a clothing model so as to follow the change in the movement of the body and the surface shape.

In a case where the first animation or the second animation includes the frame in which the self-intersection occurs, the wearing simulation device 100B according to the second embodiment executes processing for changing at least one of the joint angle and the surface shape of the body and avoiding the self-intersection by the self-intersection avoidance processing units 106*a* and 107*a*. Therefore, the simulation execution unit 110 can deform the clothing model so as to follow the change in the movement of the body and the surface shape regarding an operation including a movement for largely flexing a joint.

Furthermore, in a case where three-dimensional shape data of a body read by a body scanner 200 and motion data obtained by capturing a continuous movement by the motion capture 300 are data of different persons, the first animation or the second animation easily includes the frame in which the self-intersection occurs. However, because the self-intersection avoidance processing units 106*a* and 107*a* executes the processing for avoiding the self-intersection, even if the three-dimensional shape data of the body and the motion data are the data of different persons, the wearing simulation device 100B according to the second embodiment can deform the clothing model so as to follow the change in the movement of the body and the surface shape.

Third Embodiment

Figure 6:
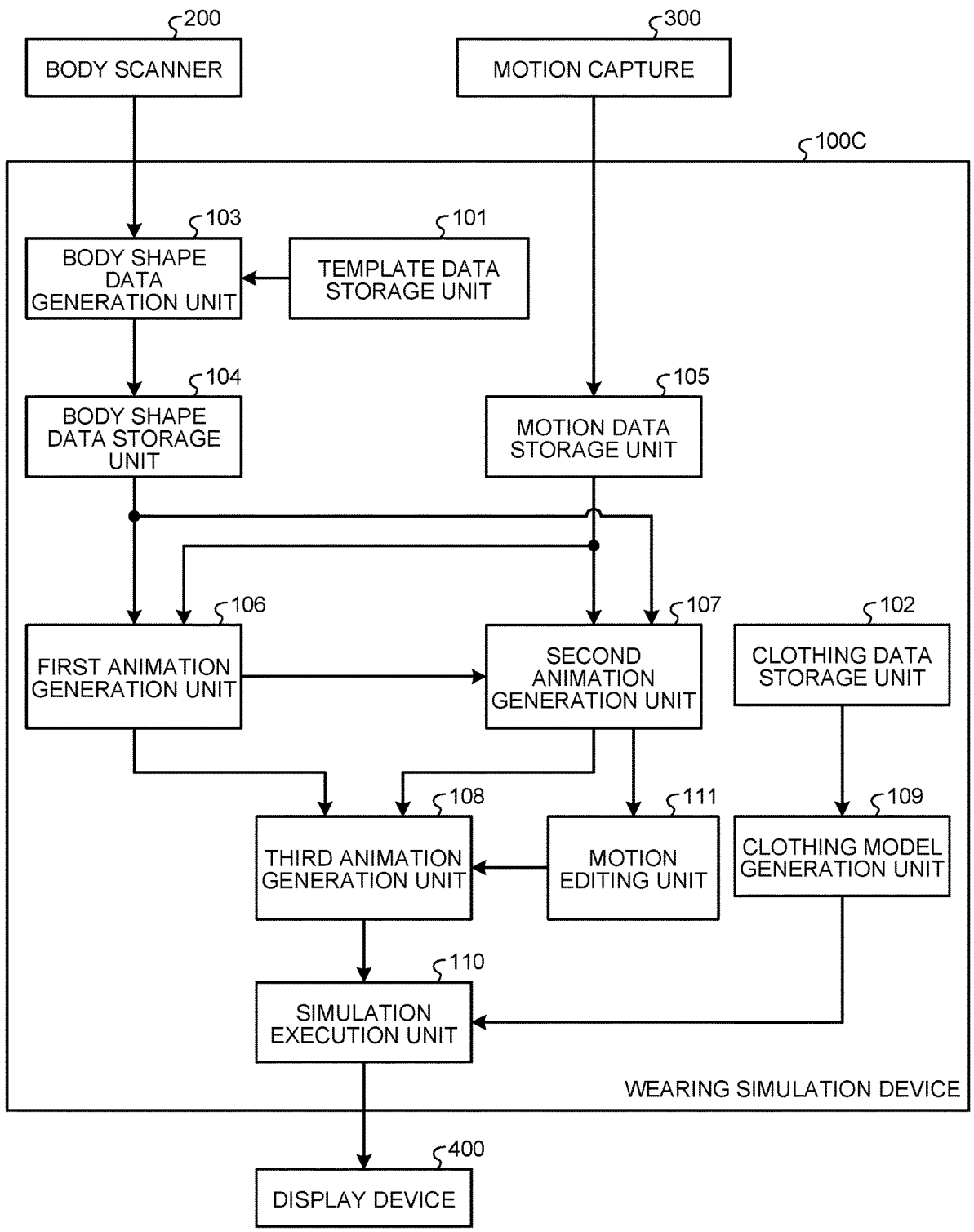
FIG. 6 is a diagram illustrating a configuration of a wearing simulation device according to a third embodiment of the present invention.

FIG. 6 is a diagram illustrating a configuration of a wearing simulation device according to a third embodiment of the present invention. A wearing simulation device 100C according to the third embodiment is different from the wearing simulation device 100A according to the first embodiment in that the wearing simulation device 100C includes a motion editing unit 111 that changes joint angles of a body in a frame in a second animation.

In a case where an operation of a subject is captured by a motion capture 300, it is difficult to take a posture that is impossible unless a joint motion of the subject exceed a normal range, for example, a posture that causes the subject to injure. On the other hand, because the motion editing unit 111 can change the joint angle of the body in the second animation, the wearing simulation device 100C according to the third embodiment can create the second animation including the posture that is difficult for the subject to take. Therefore, the simulation execution unit 110 can perform simulation by deforming a clothing model so as to follow a change in a movement and a surface shape of the body at the posture that is difficult for the subject to take. As a result, a user of the wearing simulation device 100C according to the third embodiment can perform design or the like of clothing that is less likely to hurt a wearer.

Fourth Embodiment

Figure 7:
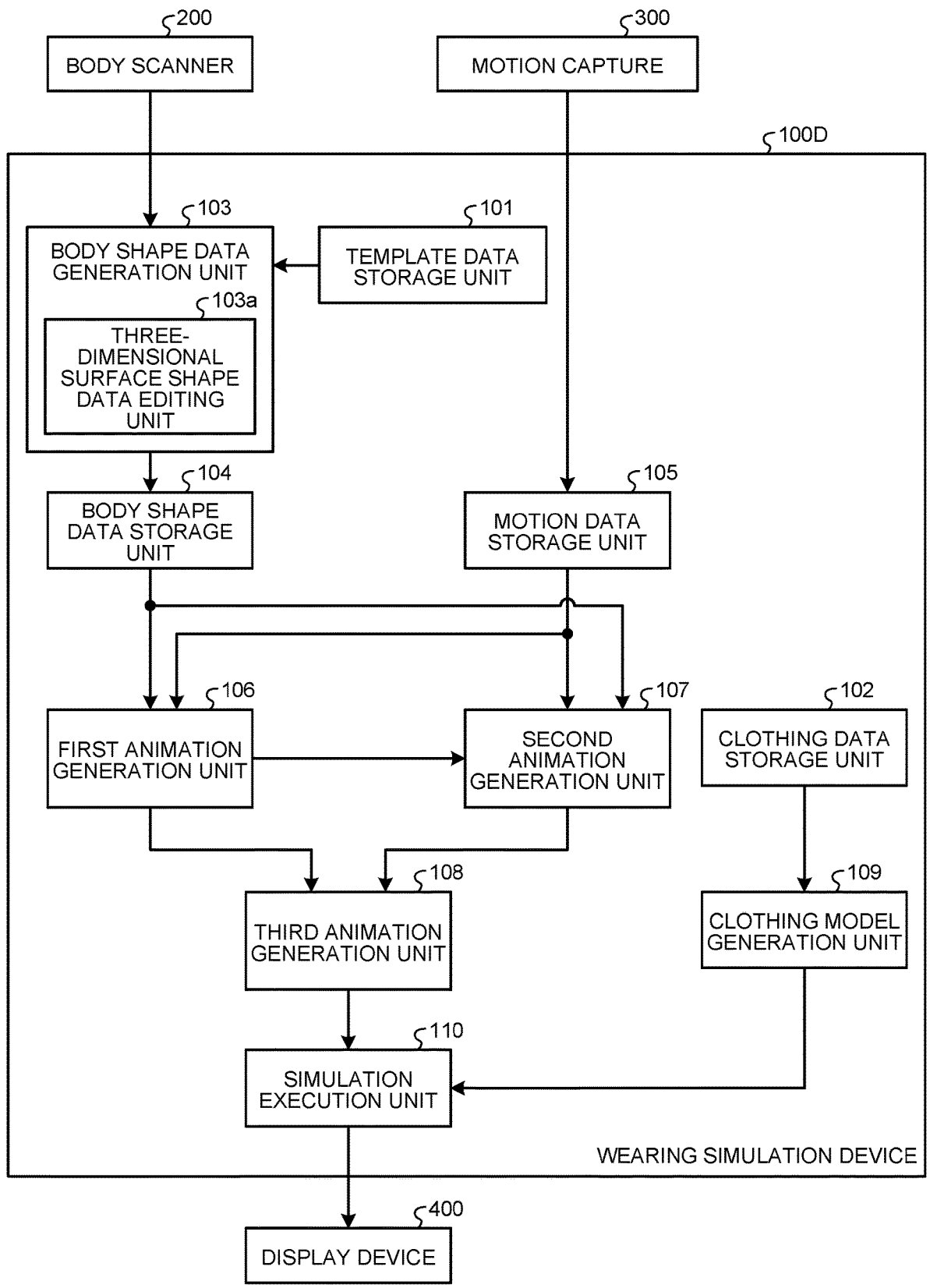
FIG. 7 is a diagram illustrating a configuration of a wearing simulation device according to a fourth embodiment of the present invention.

FIG. 7 is a diagram illustrating a configuration of a wearing simulation device according to a fourth embodiment of the present invention. A wearing simulation device 100D according to the fourth embodiment is different from the wearing simulation device 100A according to the first embodiment in that a body shape data generation unit 103 includes a three-dimensional surface shape data editing unit 103*a* that edits three-dimensional surface shape data. The three-dimensional surface shape data editing unit 103*a* can change a body shape of a body indicated by the three-dimensional surface shape data by editing the three-dimensional surface shape data.

The wearing simulation device 100D according to the fourth embodiment can generate a first animation, a second animation, and a third animation on the basis of a surface shape of the body in a case where the body shape changes by increasing or decreasing a weight of a wearer or increasing a height by changing the body shape indicated by the three-dimensional surface shape data by the three-dimensional surface shape data editing unit 103*a*. Therefore, the simulation execution unit 110 can simulate how clothing follow a change in a movement and a surface shape of the body having the body shape different from an actual body shape of a person scanned by a body scanner 200.

Fifth Embodiment

Figure 8:
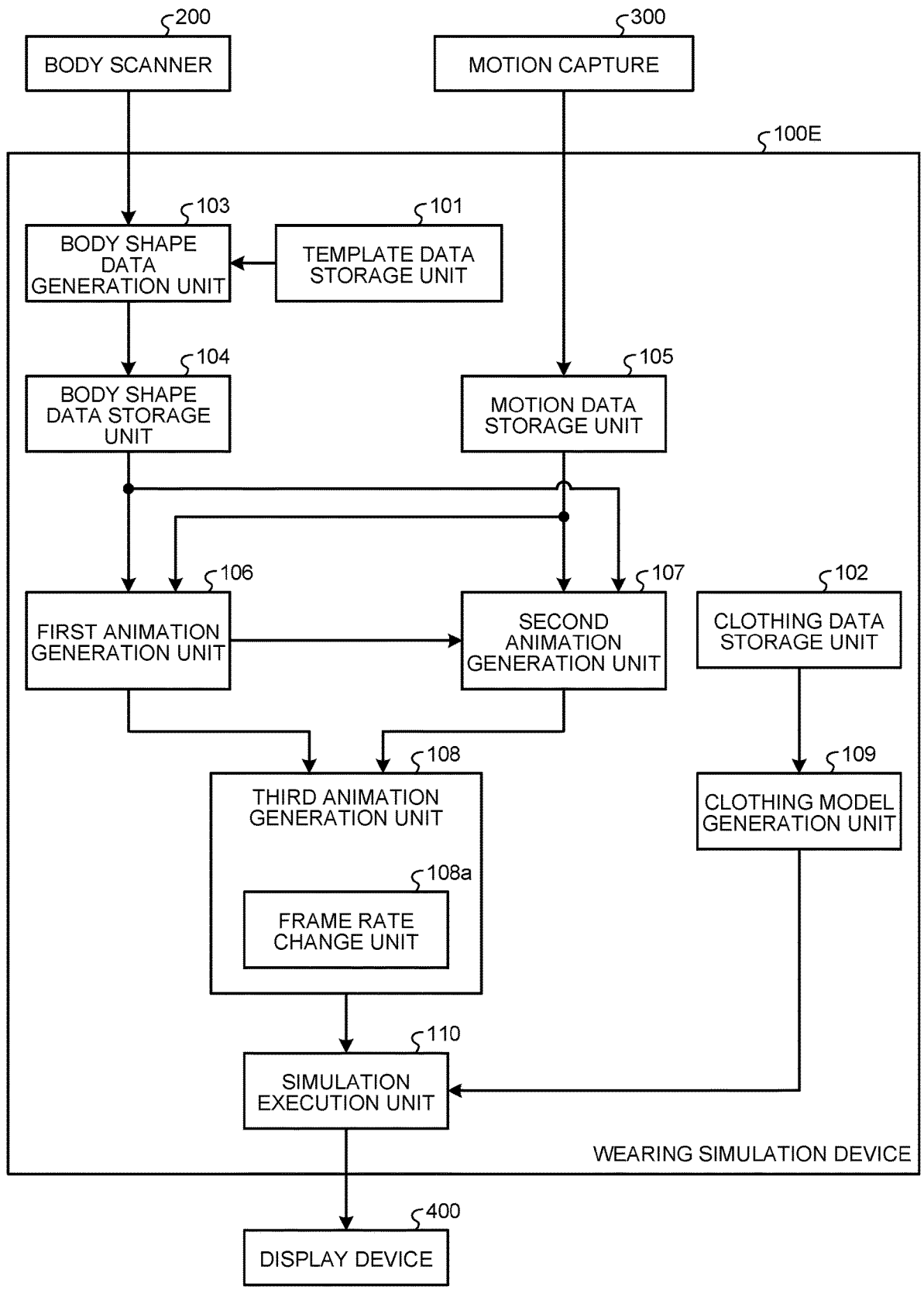
FIG. 8 is a diagram illustrating a configuration of a wearing simulation device according to a fifth embodiment of the present invention.

FIG. 8 is a diagram illustrating a configuration of a wearing simulation device according to a fifth embodiment of the present invention. A wearing simulation device 100E according to the fifth embodiment is different from the wearing simulation device 100A according to the first embodiment in that a third animation generation unit 108 includes a frame rate change unit 108*a* that changes a frame rate of a third animation. In a case of lowering the frame rate, the frame rate change unit 108*a* executes processing for decimating a frame of the third animation. Furthermore, in a case of increasing the frame rate, the frame rate change unit 108*a* executes processing for interpolating the frame so as to make an intermediate posture between postures in the preceding and following frames.

In a case where a continuous movement starting from a first posture is a slow operation, even if the frame rate is low, the clothing can follow a change in a movement and a surface shape of a body. Therefore, in a case where the slow operation is simulated, by executing the processing for lowering the frame rate by the frame rate change unit 108*a*, it is possible to reduce a processing load of the simulation execution unit 110 and increase an execution speed of the simulation. Furthermore, in a case where a fast operation is simulated, when the frame rate is low, it is not possible for the clothing to follow the change in the movement and the surface shape of the body. However, by executing processing for interpolating the frame and increasing the frame rate by the frame rate change unit 108*a*, the simulation execution unit 110 can make the clothing follow the change in the movement and the surface shape of the body and execute the simulation.

Figure 9:
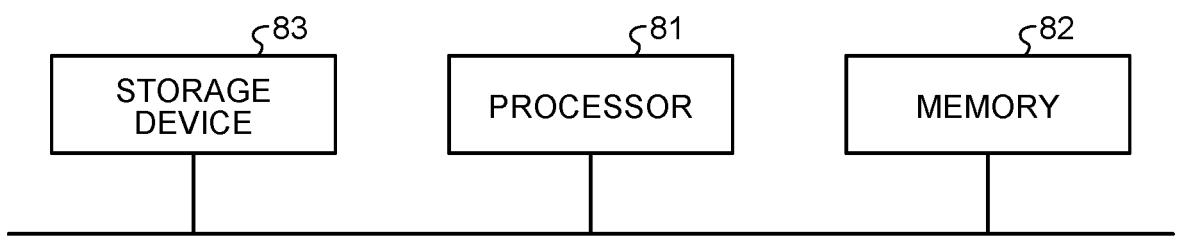
FIG. 9 is a diagram illustrating a hardware configuration example of the wearing simulation device according to the first to fifth embodiments.

Next, a hardware configuration of the wearing simulation devices 100A to 100E according to the respective embodiments described above will be described. FIG. 9 is a diagram illustrating a hardware configuration example of the wearing simulation devices according to the first embodiment to the fifth embodiment. FIG. 9 illustrates a hardware configuration in a case where functions of the wearing simulation devices 100A to 100E are implemented by using hardware that executes programs.

Each of the wearing simulation devices 100A to 100E includes a processor 81 that executes various types of processing, a memory 82 that is a built-in memory, and a storage device 83 that stores information. The processor 81 reads a program stored in the storage device 83 into the memory 82 and executes the program. The template data storage unit 101, the clothing data storage unit 102, the body shape data storage unit 104, and the motion data storage unit 105 are implemented by the storage device 83.

The configuration indicated in the above embodiments describes an example of content of the present invention and can be combined with another known technique, and a part of the configuration may be omitted or changed without departing from the gist of the present invention.

For example, in the embodiments described above, an example has been described in which the second posture is a stationary standing posture in which the legs are opened and the knee joints and the elbow joints are extended. However, the second posture may be other postures as long as the clothing can be worn at that posture. Specifically, the second posture may be a lying posture in which the knee joints and the elbow joints are extended. In addition, in a case where a clothing model wearing only a lower wear is simulated, it is sufficient that the second posture be a posture in which at least knee joints are extended. In a case where a clothing model wearing only an upper wear is simulated, it is sufficient that the second posture be a posture in which at least elbow joints are extended.

Furthermore, in the embodiments described above, an example has been described in which the clothing data storage unit 102 stores the part data that indicates the shapes of the plurality of parts configuring the clothing, the property data of the material of each of the plurality of parts, and the sewing information that indicates how to connect the parts and the clothing model generation unit 109 connects the plurality of parts on the basis of the sewing information so as to generate the data of the clothing model having the three-dimensional shape. However, for example, in a case of clothing having a simple structure such as socks, it is possible that the number of parts configuring the clothing is not multiple, the clothing data storage unit 102 stores part data that indicates a single part shape and property data of the single part, and the clothing model generation unit 109 generates data of a clothing model having a three-dimensional shape on the basis of the stored data.

A wearing simulation device according to the present invention achieves an effect of being able to simulate a wearing condition of clothing by reflecting a change in a surface shape of a body at the time of exercise.

What is claimed is:

1. A wearing simulation device comprising a processor, the processor being configured to:
store three-dimensional shape data of a body;
store motion data that indicates a movement of the body in a continuous movement starting from a first posture;
generate a first animation, on the basis of the three-dimensional shape data of the body, the three-dimensional shape data of the body being generated based on three-dimensional surface shape data generated by scanning the body and template data indicating standard structures of a skeleton and muscles, wherein the first animation includes a plurality of frames and indicates a change in a movement of the body and a surface shape of the body from a predetermined second posture different from the first posture to the first posture;
generate a second animation, on the basis of the motion data that is captured by a motion capture device, wherein the second animation includes a plurality of frames and indicates a change in the movement of the body and the surface shape of the body in the continuous movement starting from the first posture;
generate a third animation including a plurality of frames by connecting the first animation and the second animation;
generate data of a clothing model having a three-dimensional shape on the basis of part data that indicates shapes of parts configuring clothing and property data of a material of the part; and
make a body with the second posture wear the clothing model in at least one frame from beginning in the third animation and deform the clothing model so as to follow the change in the movement of the body and the surface shape of the body in the continuous movement in a frame after a frame in which the body with the second posture has worn the clothing model so as to simulate the continuous movement of the body that wears the clothing model and a shape change of the clothing model in the continuous movement,
wherein the processor simulates the shape change of the clothing model by simulating an elongation rate of the fabric, a tensile force generated on a fabric of the clothing model during the continuous movement, and a wearing pressure received from the clothing model by the body during the continuous movement.

2. The wearing simulation device according to claim 1, wherein the second posture is a stationary standing posture in which at least knee joints and elbow joints of joints of the body are extended.

3. The wearing simulation device according to claim 1, wherein the processor generates the first animation by interpolating a posture between the second posture and the first posture and the surface shape of the body through arithmetic processing.

4. The wearing simulation device according to claim 1, wherein, in a case where the first animation or the second animation includes a frame in which a self-intersection in which parts configuring the body interfere with each other occurs, the processor executes processing for changing at least one of a joint angle and the surface shape of the body and avoiding the self-intersection.

5. The wearing simulation device according to claim 1, wherein the processor generates the three-dimensional shape data of the body by synthesizing three-dimensional surface shape data generated by scanning a human body and template data indicating standard structures of a skeleton and muscles.

6. The wearing simulation device according to claim 5, wherein the processor generates the three-dimensional shape data of the body using the template data that differs depending on a gender.

7. The wearing simulation device according to claim 5, wherein the processor is able to edit the three-dimensional surface shape data and change a body shape of the body indicated by the three-dimensional surface shape data.

8. The wearing simulation device according to claim 1, wherein the processor changes a joint angle of the body in a frame in the second animation.

9. The wearing simulation device according to claim 1, wherein the processor is able to change a frame rate of the third animation.

10. The wearing simulation device according to claim 1, wherein the processor is configured to generate a third animation by chronologically connecting the plurality of frames of the first animation and the plurality of the second animation.

11. The wearing simulation device according to claim 1, wherein the second posture is taken prior to the first posture, and the processor generates the second animation starting from the first posture.

* * * * *